US010901392B2

(12) United States Patent
Gunzert et al.

(10) Patent No.: US 10,901,392 B2
(45) Date of Patent: *Jan. 26, 2021

(54) METHOD AND SYSTEM FOR MONITORING A PLANT OF PROCESS AUTOMATION

(71) Applicant: CodeWrights GmbH, Karlsruhe (DE)

(72) Inventors: Michael Gunzert, Karlsruhe (DE); Thomas Debes, Sinzheim (DE); Christian Hulter-Hassler, Karlsruhe (DE)

(73) Assignee: CODEWRGHTS GMBH, Karlsruhe (DE)

( * ) Notice: Subject to any disclaimer, the term of this patent is extended or adjusted under 35 U.S.C. 154(b) by 423 days.

This patent is subject to a terminal disclaimer.

(21) Appl. No.: 15/823,901

(22) Filed: Nov. 28, 2017

(65) Prior Publication Data
US 2018/0164778 A1 Jun. 14, 2018

(30) Foreign Application Priority Data

Dec. 14, 2016 (DE) .......................... 10 2016 124 350

(51) Int. Cl.
G05B 19/406 (2006.01)
H04L 12/00 (2006.01)
G05B 19/418 (2006.01)
H04L 12/28 (2006.01)

(52) U.S. Cl.
CPC ....... G05B 19/406 (2013.01); G05B 19/4185 (2013.01); G05B 19/41855 (2013.01); H04L 12/00 (2013.01); H04L 12/2803 (2013.01); G05B 2219/31229 (2013.01); Y02P 90/02 (2015.11)

(58) Field of Classification Search
CPC .................................. H04L 12/00; Y02P 90/02
USPC .......................................................... 700/28
See application file for complete search history.

(56) References Cited

U.S. PATENT DOCUMENTS

2003/0200285 A1   10/2003  Hansen et al.
2007/0005736 A1*   1/2007  Hansen ............... H04L 41/0806
                                                         709/220
2013/0031249 A1*   1/2013  Gunzert ............... G05B 19/042
                                                         709/224
2015/0281355 A1   10/2015  Maturana et al.
(Continued)

FOREIGN PATENT DOCUMENTS

DE    10 2013 107 905 A1    1/2015
EP         2 988 183 A1     2/2016

OTHER PUBLICATIONS

German Search Report, German PTO, Munich, dated May 8, 2017.

Primary Examiner — Md Azad
(74) Attorney, Agent, or Firm — Bacon & Thomas, PLLC

(57) ABSTRACT

A method and a system for monitoring a plant automation technology, comprising: a gateway, which is connected for communication with at least one field device via a first communication network, wherein the gateway is embodied to read out data from the field device; and a service device, especially a router or a switch, which is connected for communication with the gateway by means of a second communication network, wherein the service device is embodied to receive via the second communication network the data read-out by the gateway and to transmit to a management application via a third communication network the data queried by the gateway.

12 Claims, 1 Drawing Sheet

(56) References Cited

U.S. PATENT DOCUMENTS

| | | | |
|---|---|---|---|
| 2015/0281356 A1* | 10/2015 | Maturana | H04L 67/1097 |
| | | | 709/217 |
| 2016/0100437 A1* | 4/2016 | Armstrong | H04W 4/023 |
| | | | 370/249 |
| 2016/0195881 A1 | 7/2016 | Britt et al. | |
| 2016/0351045 A1 | 12/2016 | Salter | |
| 2018/0115528 A1* | 4/2018 | Rotvold | H04W 12/04 |

* cited by examiner

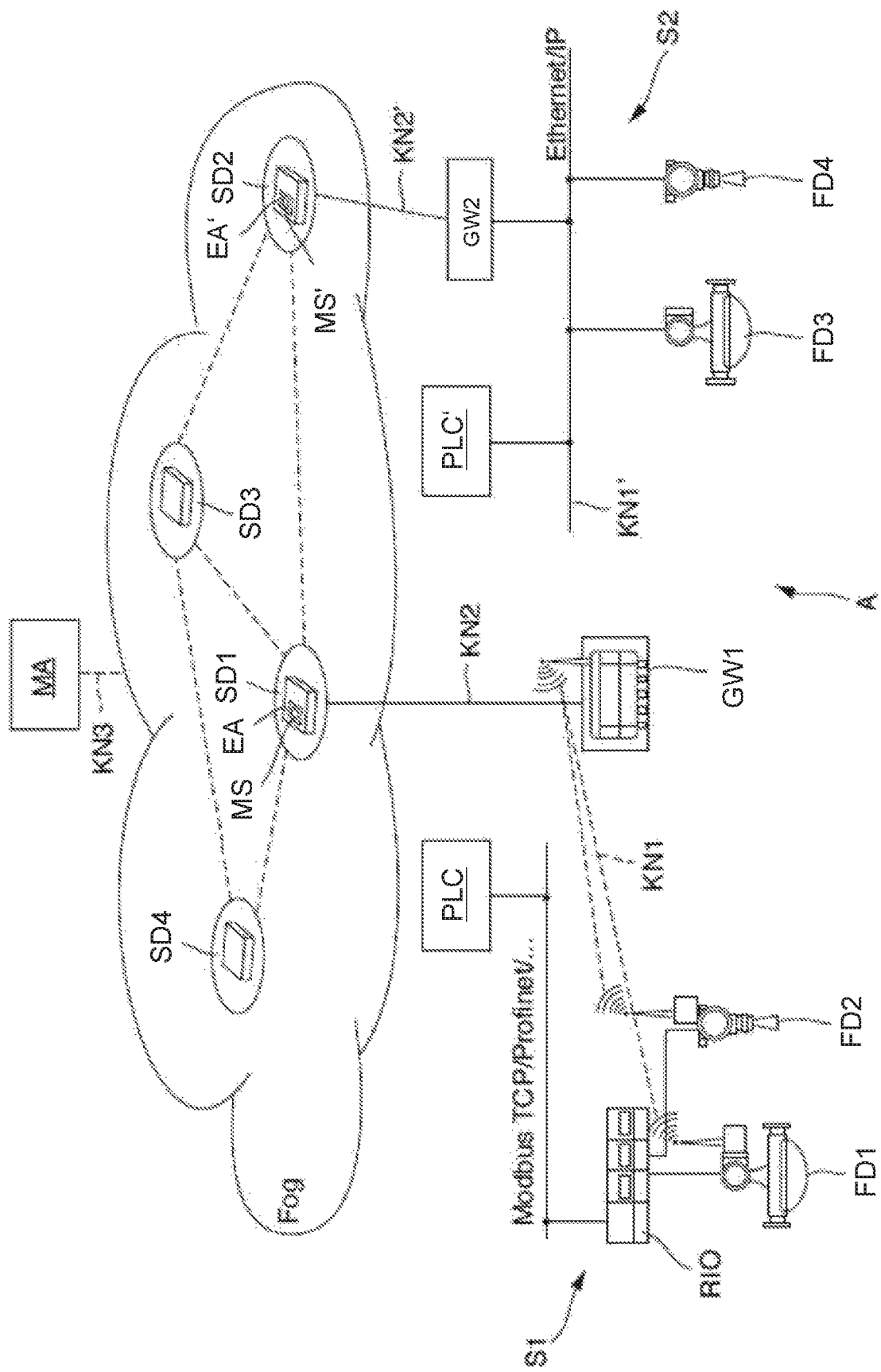

METHOD AND SYSTEM FOR MONITORING A PLANT OF PROCESS AUTOMATION

TECHNICAL FIELD

The invention relates to a method for monitoring a plant of automation technology having at least one field device. Furthermore, the invention relates to a system for performing the method of the invention.

BACKGROUND DISCUSSION

Known from the state of the art are field devices, which are used in industrial plants. In process automation, same as in manufacturing automation, field devices are often applied. Referred to as field devices are, in principle, all devices, which are applied near to the process and which deliver, or process, process relevant information. Thus, field devices are used for registering and/or influencing process variables. Serving for registering process variables are measuring devices, e.g. sensors. These are used, for example, for pressure- and temperature measurement, conductivity measurement, flow measurement, pH measurement, fill level measurement, etc., and register the corresponding process variables, pressure, temperature, conductivity, flow, pH-value, fill level, etc. Used for influencing process variables are actuators. These are, for example, pumps or valves, which can influence the flow of a liquid in a pipe or the fill level in a container. Besides the above mentioned measuring devices and actuators, understood to be field devices are also remote I/Os, radio adapters, and, generally, devices, which are arranged at the field level.

A large number of such field devices are produced and sold by the Endress+Hauser group.

In modern industrial plants, field devices are, as a rule, connected via communication networks, such as, for example, fieldbusses (Profibus®, Foundation® Fieldbus, HART®, etc.), with superordinated units. Superordinated unit include control units, such as, for example, a PLC (programmable logic controller). Superordinated units serve, among other things, for process control, as well as for start-up of the field devices. The measured values registered by field devices, especially sensors, are transmitted via the particular bus system to one or more superordinated units, which, in given cases, further process the measured values and forward them to the control room of the plant. The control room serves for process visualizing, process monitoring and process control via the superordinated units. Along with that, also data transmission from the superordinated unit via the bus system to the field devices is required, especially for configuration and parametering of field devices as well as for operating actuators.

The communication networks are, as a rule, closed bus systems, which provide no outwardly freely configurable, or freely accessible, data interfaces. A further use of the data generated and/or exchanged within the communication network outside of the communication network is thus difficult and is not implementable without cooperation of the system provider.

For users, who apply different bus systems in their plants, there is basically no possibility to bring together data from these different bus systems into a central system at an acceptable cost/benefit ratio.

Technologies, such as, for example, the Open Platform Communications Unified Architecture (OPC UA for short) offer an opportunity for representing data in a universal information model, however, such requires the acceptance and integration of the needed software components into all participating bus systems and field devices. While this can be done for plants with a manageable number of field devices, the effort and requirements increase, when these field devices are geographically distributed. The amount of data balloons in size, moreover, with an increasing number of field devices, which, in turn, leads to the fact that a corresponding infrastructure must be present and power demands must be fulfilled.

SUMMARY

Starting from this picture, an object of the invention is, in simple and secure manner, to make data of an automation plant available outside of the plant.

The object is achieved by a method for monitoring a plant of automation technology having at least one field device, wherein the method comprises method steps as follows:
 by means of a gateway via a first communication network, reading-out data available in the field device;
 transmitting the read-out data to a service device via a second communication network;
 filtering, or otherwise preprocessing, the transmitted data by the service device; and
 transmitting the filtered, or otherwise preprocessed, data to a management application via a third communication network.

A great advantage of the method of the invention is that data available in the field devices of a plant of process automation can be made available outside of the plant without major updating/upgrading of the components of the plant (field devices, gateways, etc.). The method enables, in such case, a universal, manufacturer- and device type independent accessing of the data.

The terminology, filtering, means a preselection of data. For example, the data are filtered as regards dynamic device data, so that the static device data are filtered out and, thus, not transmitted to the management application. It can also be provided that data, which are not relevant, are not even read-out.

The terminology, preprocessing, means especially that the read-out data are combined and transmitted so grouped. It can also be provided that the data are converted into a special format, for example, into an XML format.

Field devices, as mentioned in connection with the method of the invention, have already been described, by way of example, in the introduction above.

A preferred embodiment of the method of the invention provides that the filtered, or otherwise preprocessed, data are supplemented with other information before transmission to the management application. In such case, involved, above all, is information, which is necessary, in order to be able to interpret the read-out data of the field device (for example, in order to expand a diagnostic report transmitted as an error code with a corresponding meaning of the error in cleartext). The additional information can be, for example, however, also a time stamp or an identification of the gateway and/or the service device. This serves, for example, for simple and unique labeling of the data of a field device in a plant wide address space, or associating of the data with a time.

In an advantageous further development of the method of the invention, it is provided that the information is read-out by tapping cyclic data traffic transmitted in the first communication network and/or by active queries of the data from the field device. In the case of tapping, the gateway does not have to be made known to the communication network, since it is not actively participating in the communication, but, instead, only receives data transmitted in the communication network. Such a gateway is described, for example, in German Patent, DE 10 2008 019 053 B4.

In the case that the gateway reads out the data by active queries, the gateway must be embodied as a host, or master, as the case may be. If, for example, Profibus Process Automation (PA) is used as communication network, then the gateway must be a Master Class 2.

In such case, it can be provided that the gateway is permitted only a reading accessing of the field devices and write access is blocked, when the write request comes from the service device. Alternatively, write access can be limited to a few functions. For the two cases, there is implemented in the gateway a white list, which contains allowed transactions/functions for the respective device types of the field devices.

In an especially advantageous further development of the method of the invention, it is provided that the read-out of the data generated by means of the field device occurs in predefined time intervals. The predefined time intervals are, for example, established by the configuration of the gateway. In an advantageous embodiment of the method of the invention, it is provided that the transmitting of the read-out data to the service device and/or the transmitting of the filtered, or otherwise preprocessed, data to the management application occurs secured, e.g. encrypted. Used for encrypting is, for example, an SSL (Secure Sockets Layer) or TLS (Transport Layer Security) encryption protocol. Additionally or alternatively, the participating components, thus the service device, the gateway and/or the management application, are integrated into a virtual private network (VPN), via which the data are transmitted.

Before transmission of the data by the gateway, or by the service device, the data are temporarily stored in these devices. For increased security, the temporary storing of the data in the devices can occur encrypted.

As an additional security feature, the service device contains a function for detecting and preventing DDoS (Distributed Denial of Service) attacks. The detection is based, for example, on pattern matching and detects irregularities in the type and frequency of the data, which are sent from the service device to the management application. This function can be executed, for example, in a separate execution layer (for example, a virtual machine) of the service device.

Furthermore, the object is achieved by a system for performing the method of the invention, wherein the system comprises:

a gateway, which is connected for communication with at least one field device via a first communication network, wherein the gateway is embodied to read out data from the field device; and a service device, especially a router or a switch, which is connected for communication with the gateway by means of a second communication network, wherein the service device is embodied to receive via the second communication network the data read-out by the gateway and to transmit to a management application via a third communication network the data queried by the gateway.

A great advantage of the system of the invention is that the method of the invention can be executed by only one additional data connection between the gateway and the service device in existing components of the plant (field devices, gateway). It is, in such case, not necessary, that the field devices must support additional protocols. Since the method of the invention requires very few resources as regards computing power and memory requirement, it can be implemented in industrial routers (for example, the Cisco IRT829) and in gateways.

For this, it is provided in an advantageous embodiment of the system of the invention that the gateway or the service device has an execution application, which is embodied to initiate the read-out of the data from the field device by the gateway. The execution application tells the gateway, which data is to be read-out of which specific field devices at defined points in time.

Furthermore, it is provided in an advantageous embodiment of the system of the invention that the execution application is embodied to interpret read-out data and to interpret, to filter, and to preprocess before the transmission to the management application. Definition of the terms filtering and preprocessing has already been described above in connection with the method of the invention.

In an advantageous further development of the system of the invention, it is provided that the execution application has for the type of field device a microservice, which contains information and algorithms required for the read-out and interpreting of the data of the field device. The microservice is characterized in that it has a small file size and thereby requires only little memory capacity in the gateway, or in the service device. This microservice is externally produced, for example, in a computer unit of a user.

Developing this further, it is provided in an additional embodiment of the system of the invention that the microservice is generated based on a device model produced from information concerning the field device. Especially involved here is a device description, especially a device description based on Electronic Device Description (EDD) or Field Device Integration (FDI) technology. For this, the device description is analyzed and, for all readable device variables of the device type of the field device, information is generated, which is required for read-out and interpreting of the data of the field device (for example, fieldbus command number, request data, the byte position of the datum in the response of the field device, the data type, the value range, the meaning of the enumeration values, etc.), wherein also dependencies of the device variables or index based commands are taken into consideration.

In an especially preferred further development of the system of the invention, it is provided that the microservice is present in a binary and/or encrypted file format. Additionally, the microservice can be provided with a digital signature, so that hacking of the microservice is prevented.

An advantageous embodiment of the system of the invention provides that the data is static device data, especially parameter values and/or configuration data, and/or dynamic device data, especially measured values and/or diagnostic values.

In a preferred embodiment of the system of the invention, the first communication network is a wireless or wired fieldbus according to a fieldbus protocol of automation technology. In principle, in such case, any protocol of a wired fieldbus automation technology, such as Foundation Fieldbus®, Profibus®, Profinet®, HART®, ModBus®, Industrial Ethernet, etc. can be used. An example of a wireless network protocol is, for example, the wireless HART protocol.

In a preferred embodiment of the system of the invention, the second communication network has an industrial Ethernet-protocol, especially Ethernet/IP, HART-IP or Profinet.

In a preferred embodiment of the system of the invention, the third communication network is a Local Area Network or a Wide Area Network, especially the Internet, or a radio network, especially GSM, LTE or 5G. Used for communication via the third network is an IoT (Internet of Things) protocol, for example, MQTT, AMQP, MAConnect or OPC-UA.

With respect to all three communication networks, it is to be noted that the mentioned network- and protocol types are by way of example and a large number of other suitable network- and protocol types are known to those skilled in the art.

BRIEF DESCRIPTION OF THE DRAWING

The invention will now be explained in greater detail based on the appended drawing, the sole FIGURE of which shows as follows:

FIG. 1 is an example of an embodiment of the method of the invention.

DETAILED DESCRIPTION IN CONJUNCTION WITH THE DRAWING

FIG. 1 shows an example of an embodiment of the method of the invention and of the system of the invention. Displayed schematically for this is a plant A of process automation. Plant A is composed of two segments S1, S2, each of which includes a control unit PLC, PLC', a fieldbus and a plurality of field devices FD1, FD2, FD3, FD4. Examples and functions of such field devices FD1, FD2, FD3, FD4 have already been set forth above in the introduction of the description.

In the case of the first segment S1 of the plant A, a fieldbus network is used, which is composed of two parts: via a 4-20 mA electrical current loop, which transmits the HART protocol, the field devices FD1, FD2 are connected to a remote-I/O RIO. This remote-I/O is, in turn, connected by means of a ModBus Transmission Control Protocol (TCP) fieldbus or a Profinet fieldbus with the control unit PLC.

In order to provide data, especially static and dynamic device data, of the field devices FD1, FD2 available in the first segment S1 of the plant A, outside of the plant A, a first communication network KN1 is established parallel to the fieldbus. For this, the field devices FD1, FD2 are, in each case, equipped with a wireless-HART adapter supplied with electrical energy via the 4-20 mA electrical current loop of the field device. Via the first communication network KN1, thus the wireless HART connection, the field devices FD1, FD2 are connected with a gateway GW1, here a wireless HART gateway, for communication. Alternatively, the wireless HART adapters have, in each case, a separate energy supply, for example, in the form of a battery.

In the case of the second segment S2 of the plant, the field devices are connected to the control unit PLC' directly by means of a fieldbus, here a fieldbus, which uses the industrial Ethernet protocol, Ethernet/IP.

In order to provide data, especially static and dynamic device data, of the field devices FD3, FD4 available in the second segment S2 of the plant A, outside of the plant A, a gateway GW2 is connected directly to the fieldbus. Since here no connection parallel to the fieldbus is necessary, the fieldbus of the invention is referred to as a first communication network KN1'.

Independently of the exact construction of a segment S1, S2 of a plant A, referred to as first communication network is that communication network, which enables a communication connection from the field devices FD1, FD2, FD3, FD4 to the gateway GW1, GW2.

The gateway is connected with a service device SD1, SD2 by means of a second communication network KN2, KN2', especially by means of a communication network using an industrial Ethernet protocol. This service device SD1, SD2, also referred to as an edge device, is especially a switch or a router, and is part of a fog computing network, composed of a plurality of such service devices SD1, SD2, SD3, SD4.

Besides the shown segments S1, S2, a large number of other segments can be connected via other gateways with the service devices SD1, SD2, SD3, SD4. It is also possible to connect a number of—even different—gateways with one of the service devices SD1, SD2, SD3, SD4.

Running in the service device SD1, SD2 is an execution application EA, EA' which initiates a read-out of data of the field devices FD1, FD2, FD3, FD4 by means of the gateway GW1, GW2. For this, the execution application EA, EA' includes at least one microservice MS, MS'. The microservice MS, MS' is field device type-specific and is generated based on a device model, for example, an EDD- or a FDI-device description, produced from information concerning the field device (FD1, FD2, FD3, FD4). These device descriptions contain occasionally not all information necessary for interpreting the data of the field devices FD1, FD2, FD3, FD4, or they contain methods, which can be integrated in such form only difficultly into a microservice MS, MS'. Therefore, it can be provided that the device model is expanded by other means, for example, manually. From the expanded device model, then a corresponding microservice MS, MS' can be generated.

Alternatively, the execution application EA is implemented in the gateway GW1, GW2.

The gateway GW1, GW2 reads the data from the field devices FD1, FD2, FD3, FD4. The execution application EA, EA' can, in such case, be configured by the user in such a manner that only certain field devices are read-out, only certain data—depending on type of field device FD1, FD2, FD3, FD4—are read-out and/or the read-out is initiated at established points in time. The read-out of the field device data occurs as a function of type of gateway GW1, GW2 and type of fieldbus used in the segment S1, S2 of the plant A. The gateway GW, GW' can thus be embodied, for example, as a host or master and perform the read-out of the field devices FD1, FD2, FD3, FD4 by means of acyclic communication, or develop the required data with the assistance of a listener-functionality by tapping the active data traffic on the fieldbus.

The read-out data can, when required, then be filtered and/or preprocessed by means of the execution application EA.

The by means of the gateway GW1, GW2 read-out, in given cases, filtered and/or preprocessed, data of the field devices FD1, FD2, FD3, FD4 can, when required, be supplemented during run time by information from the microservices MS, MS'. For example, a diagnostic report transmitted as an error code can be supplemented with a corresponding meaning of the error code in cleartext. In this way, the data are made interpretable for superordinated applications, for example, a management application MA, without these applications needing the device-specific knowledge.

Following all of this, the read-out, filtered and/or preprocessed, data are sent via a third communication network KN3, especially the Internet, to a management application MA, in which the data are secured and/or processed. The management application MA is, for example, an application located in a cloud.

Since the device data partially involves sensitive information, safety/security functions are implemented in the method: Thus, it is provided, for example, that the transmitting of the read-out data to the service device SD1, SD2 and/or the transmitting of the filtered, or otherwise preprocessed, data to the management application MA occurs secured, respectively encrypted. Used for this is, for example, an SSL (Secure Sockets Layer)-, or a TLS (Transport Layer Security) encryption protocol. Additionally or alternatively, the participating components, thus the service devices SD1, SD2, SD3, SD4, the gateways GW1, GW2 and/or the management application MA, are integrated into a virtual private network, via which the data are transmitted.

Before the transmission of the data by the gateway GW1, GW2, or by the service device SD1, SD2, the data are temporarily stored in the relevant device GW1, GW2, SD1, SD2. For increasing security, the temporary storing of the data in the gateway GW1, GW2, or in the service device SD1, SD2 can occur encrypted.

As an additional security feature, the service device SD1, SD2 contains a function for detecting and preventing DDoS (Distributed Denial of Service) attacks. The detection is based, for example, on pattern matching and detects irregularities in the type and frequency of the data, which are sent from the service device SD1, SD2 to the management application MA.

Of course, the examples of embodiments here are exclusively by way of example and the method of the invention is performable with any type and arrangement of field devices FD1, FD2, FD3, FD4 in segments of a plant A of process automation.

The invention claimed is:

1. A method for monitoring a plant of automation technology, which has at least one field device, comprising:
reading-out data available in the field device by means of a gateway via a first communication network;
transmitting the read-out data to a service device via a second communication network, wherein the service device is a switch or a router and wherein the service device is part of a fog computing network composed of a plurality of service devices;
filtering or preprocessing the transmitted data by the service device, wherein preprocessing includes combining the transmitted data or converting the transmitted data from the first file format into a second file format; and
transmitting the filtered or preprocessed data to a management application located in a cloud via a third communication network and securing or processing of the filtered or preprocessed data in the management application,
wherein said gateway or said service device has an execution application, which initiates the read-out of the data from the field device to said gateway,
wherein said execution application has for the type of the field device a microservice, which contains information and algorithms required for the read-out and interpreting of the data of the field device,
wherein said microservice is generated based on a device model produced from information concerning the field device,
wherein the device model is a device description.

2. The method as claimed in claim 1, wherein:
said filtered or preprocessed data are supplemented with other information before transmission to the management application.

3. The method as claimed in claim 1, wherein:
the information is read-out by tapping cyclic data traffic transmitted in said first communication network or by active queries of the data from the field device.

4. The method as claimed in claim 1, wherein:
the read-out of the data generated by means of the field device occurs in predefined time intervals.

5. The method as claimed in claim 1, wherein:
said transmitting of the read-out data to the service device or the transmitting of the filtered or preprocessed data to the management application occurs secured, e.g. encrypted.

6. A system for performing a method comprising:
a method for monitoring a plant of automation technology, which has at least one field device, comprising: reading-out data available in the field device by means of a gateway via a first communication network; transmitting the read-out data to a service device via a second communication network; filtering or preprocessing the transmitted data by the service device, wherein preprocessing includes combining the transmitted data or converting the transmitted data from a first file format into a second file format; and transmitting the filtered or preprocessed data to a management application via a third communication network, the system comprising:
a gateway, which is connected for communication with at least one field device via a first communication network, said gateway is embodied to read out data from the field device; and
a service device, which is a router or a switch and which is connected for communication with said gateway by means of a second communication network said service device is embodied to receive via said second communication network the data read-out by said gateway and to transmit to a management application located in a cloud via a third communication network the data queried by said gateway, wherein the service device is part of a fog computing network composed of a plurality of service devices,
wherein said gateway or said service device has an execution application, which is embodied to initiate the read-out of the data from the field device to said gateway,
wherein said execution application has for the type of the field device a microservice, which contains information and algorithms required for the read-out and interpreting of the data of the field device,
wherein said microservice is generated based on a device model produced from information concerning the field device,
wherein the device model is a device description.

7. The system as claimed in claim 6, wherein:
said execution application is embodied to interpret read-out data and to interpret, to filter, and to preprocess before the transmission to said management application.

8. The system as claimed in claim 6, wherein:
said microservice is present in a binary or encrypted file format.

9. The system as claimed in claim 6, wherein:
the data is static device data, parameter values or configuration data, or dynamic device data, measured values or diagnostic values.

10. The system as claimed in claim 6, wherein:
said first communication network is a wireless or wired fieldbus according to a fieldbus protocol of automation technology.

11. The system as claimed in claim 6, wherein:
said second communication network has an industrial Ethernet protocol, Ethernet/IP, HART-IP or Profinet.

12. The system as claimed in claim 6, wherein:
said third communication network is a Local Area Network or a Wide Area Network, the Internet, or a radio network, especially GSM, LTE or 5G.

* * * * *